United States Patent
Lind

(10) Patent No.: US 9,992,259 B2
(45) Date of Patent: Jun. 5, 2018

(54) SYSTEMS AND METHODS TO CIRCUMVENT ADVERTISEMENT BLOCKING ON THE INTERNET

(71) Applicant: Alexander Lind, El Dorado, CA (US)

(72) Inventor: Alexander Lind, El Dorado, CA (US)

(73) Assignee: YAVLI LIMITED, Maidstone (GB)

( * ) Notice: Subject to any disclaimer, the term of this patent is extended or adjusted under 35 U.S.C. 154(b) by 310 days.

(21) Appl. No.: 15/092,050

(22) Filed: Apr. 6, 2016

(65) Prior Publication Data

US 2016/0301735 A1    Oct. 13, 2016

Related U.S. Application Data

(60) Provisional application No. 62/146,066, filed on Apr. 10, 2015, provisional application No. 62/163,020, filed on May 18, 2015, provisional application No. 62/172,711, filed on Jun. 8, 2015.

(51) Int. Cl.
| | |
|---|---|
| *H04L 29/06* | (2006.01) |
| *G06Q 30/02* | (2012.01) |
| *H04L 29/08* | (2006.01) |
| *H04M 15/00* | (2006.01) |

(52) U.S. Cl.
CPC ....... *H04L 67/025* (2013.01); *G06Q 30/0277* (2013.01); *H04L 67/10* (2013.01); *H04L 67/20* (2013.01); *H04L 67/2819* (2013.01); *H04L 67/2895* (2013.01); *H04M 15/09* (2013.01)

(58) Field of Classification Search
CPC ....... H04L 67/025; H04L 67/10; H04L 67/20; H04L 67/2819; H04L 67/2895; G06Q 30/0277; H04M 15/09
See application file for complete search history.

(56) References Cited

U.S. PATENT DOCUMENTS

| 7,058,633 | B1 * | 6/2006 | Gnagy | .............. G06F 17/30887 |
| 9,177,335 | B1 * | 11/2015 | Carasso | .................... G06F 9/00 |
| 2005/0044185 | A1 | 2/2005 | Hind | |

(Continued)

OTHER PUBLICATIONS

PCT International Search Report and Written Opinion for PCT/IB2016/000559 dated Aug. 22, 2016, 11 pp.

*Primary Examiner* — Larry Donaghue

(74) *Attorney, Agent, or Firm* — Buckley, Maschoff & Talwalkar LLC

(57) ABSTRACT

A publisher web server may receive from an end user device a web page request. A plug-in installed at the publisher web server may transmit information about the request to an advertisement blocking circumvention platform. The platform may respond with information including an invalid URL resource address, and the publisher web server may transmit a data package, including the information about the invalid URL, to the end user device. The publisher web server may then receive from the end user device a resource request including the invalid URL, and information about the invalid URL may be forwarded to the platform. Responsive to receiving the information about the invalid URL, the platform may transmit a message (including advertising content) and the publisher web server may transmit to the end user device a response to the resource request such that the advertising content will be delivered via the end user device.

20 Claims, 5 Drawing Sheets

(56) References Cited

U.S. PATENT DOCUMENTS

| | | | |
|---|---|---|---|
| 2006/0235960 A1* | 10/2006 | Lai | G06Q 30/02 |
| | | | 709/224 |
| 2011/0064383 A1* | 3/2011 | Bauchot | G06Q 30/02 |
| | | | 386/248 |
| 2016/0063578 A1* | 3/2016 | Carasso | G06F 9/00 |
| | | | 705/14.73 |
| 2016/0253718 A1† | 9/2016 | Carasso | |

\* cited by examiner
† cited by third party

SYSTEMS AND METHODS TO CIRCUMVENT ADVERTISEMENT BLOCKING ON THE INTERNET

CROSS-REFERENCE TO RELATED APPLICATIONS

The present application claims the benefit of: U.S. Provisional Patent Application No. 62/146,066 entitled "SYSTEMS AND METHODS TO CIRCUMVENT ADVERTISEMENT BLOCKING ON THE INTERNET" and filed Apr. 10, 2015; U.S. Provisional Patent Application No. 62/163,020 entitled "SYSTEMS AND METHODS TO CIRCUMVENT ADVERTISEMENT BLOCKING ON THE INTERNET" and filed May 18, 2015; and U.S. Provisional Patent Application No. 62/172,711 entitled "SYSTEMS AND METHODS TO CIRCUMVENT ADVERTISEMENT BLOCKING ON THE INTERNET" and filed Jun. 8, 2015. The entire contents of these patent applications are incorporated herein by reference.

BACKGROUND

Advertisement blocking associated with communication networks, such as the Internet, may include a variety of technologies and devices (both hard and software) aimed at preventing advertisements from being called by advertisement servers and displayed on Internet users' browsers when webpages are visited. Multiple parties provide advertisement blocking solutions, and the most common way consumers block advertisements today is by using Internet web browser extensions, such as AdBlock and AdBlock Plus. Overcoming advertisement blocking can be difficult because the technology may be based on open-source code and/or a database of blacklisted advertisements fed by a large and dynamic community of contributors.

There are numerous advertisement blocking browser extensions that consumers can download into a browser—including Internet Explorer® from Microsoft, Safari®, Chrome® from Google, Firefox, etc. Moreover, advertisement blocking can be installed on desktop Internet browsers for free via a browser's webstore or an advertisement blocking provider's website in just a few seconds. This makes downloading browser extensions seamless and strongly encourages adoption through viral sharing and word of mouth.

Advertisement blocking can also take the form of a hardware device to plug on an Internet router; this method is more common on enterprise routers—for companies that do not want their employees to access some Internet services. Tools like AdTrap2 may be used to block advertisements on multiple devices working on the same Internet connection—including mobile phones, which might not utilize browser extensions.

Note that a portion of advertisement users may use the program unknowingly and/or unwillingly. This may be the case, for example, with employees of companies imposing advertisement blocking on their servers, clients of Internet providers adding advertisement blocking on their routers, and/or clients of anti-virus solutions setting advertisement blocking options by default.

Many consumers recognize the fact that publishers need to display advertising in order to stay in business and produce content. Some advertisement blocking extension users are not opposed to all forms of advertising, and instead just use advertisement blocking to prevent the most "intrusive" forms of advertising on the Internet. However, as a by-product of this approach nearly all advertising may be blocked, which prevents publishers from monetizing almost the entire portion of users on their site who use advertisement blocking.

Also note that many publishers rely upon advertising sales to sustain their businesses. It is a primary income source to pay bills and keep the business afloat. Content production may be expensive, and advertising rates online are relatively low in comparison to other forms of media, and as a result publishers often operate on thin margins in order to stay in business. With an ever greater portion of advertising revenue taken away from publishers due to advertisement blocking, their long term financial viability may suffer.

An advertisement blocking web browser extensions may provide functionality for consumers to "unblock" advertising locally on particular sites—or even unblocking certain advertising companies across the Internet. This functionality is included in a number of extensions to enable users to generate advertising revenue on websites they frequent often (in an effort so they can help financially sustain those sites). However, most users do not tweak or change the default settings on their advertisement blocking extension after it is installed, which means that most advertising is always blocked by default.

It would be desirable to provide systems and methods to automatically, effectively, and efficiently circumvent advertisement blocking associated with a communication network.

SUMMARY OF THE INVENTION

According to some embodiments, systems, methods, apparatus, computer program code and means are provided to automatically circumvent advertisement blocking associated with a communication network. According to some embodiments, a publisher web server may receive from an end user device a web page request. A plug-in installed at the publisher web server may arrange for information about the web page request to be transmitted by proxy to an advertisement blocking circumvention platform. The advertisement blocking circumvention platform may respond with information including an invalid Uniform Resource Locator ("URL") resource address, and the publisher web server may transmit a data package, including the information about the invalid URL resource address, to the end user device. The publisher web server may then receive from the end user device a resource request including the invalid URL resource address, and information about the invalid URL resource address and a publisher identifier may be transmitted to the advertisement blocking circumvention platform. Responsive to receiving the information about the invalid URL resource address, the advertisement blocking circumvention platform may transmit a message including advertising content and the publisher web server may transmit to the end user device a response to the resource request including the advertising content such that the advertising content will be delivered via the end user device.

Some embodiments comprise: means for receiving, at a publisher web server from an end user device via the communication network, a web page request; means for arranging, by a plug-in installed at the publisher web server, for information about the web page request to be transmitted by proxy to an advertisement blocking circumvention platform; responsive to receiving the information about the web page request, means for transmitting, from the advertisement blocking circumvention platform to the publisher web server, information including an invalid Uniform Resource Locator ("URL") resource address; means for transmitting, from the publisher web server to the end user device, a data package including the information about the invalid URL resource address; means for receiving, at the publisher web server from the end user device, a resource request including the invalid URL resource address; means for arranging, by the plug-in at the publisher web server, for information about the invalid URL resource address and a publisher identifier to be transmitted to the advertisement blocking circumvention platform; responsive to receiving the information about the invalid URL resource address, means for transmitting, from the advertisement blocking circumvention platform to the publisher web server, a message including advertising content; and means for transmitting from the publisher web server to the end user device a response to the resource request including the advertising content such that the advertising content will be delivered via the end user device.

In some embodiments, a communication device associated with one or more computer servers exchanges information with remote devices. The information may be exchanged, for example, via public and/or proprietary communication networks.

A technical effect of some embodiments of the invention is an improved and computerized way to automatically circumvent advertisement blocking associated with a communication network. With these and other advantages and features that will become hereinafter apparent, a more complete understanding of the nature of the invention can be obtained by referring to the following detailed description and to the drawings appended hereto.

DETAILED DESCRIPTION

As used herein, the phrases "advertisement blocking traffic" or "AdBlocker traffic" may refer to, for example, visitors to a website who have any type of advertisement blocking plugin (or other ad-blocking technology such as a router with built-in advertisement blocking support) installed, and consequently don't see most advertisements. Moreover, the terms "advertisement blocking" or "AdBlocker" may refer to, for example, any software that blocks advertising (and may be associated with a web browser extension or software at the router level). Examples may include AdBlock and AdBlock Plus web browser extensions. The term "publisher" may refer to, for example, a person or company that operates a website and wants to display advertising content to visitors. The term "Easylist" may refer to a main list of domains, URL patterns, and/or HTML patterns maintained by AdBlocker enthusiasts. Moreover, the phrases "advertisement blocking" or "Adblocks" may be associated with, for example, domains, URL patterns, and/or HTML patterns that are added to Easylist for the purpose of blocking ads.

Figure 1:
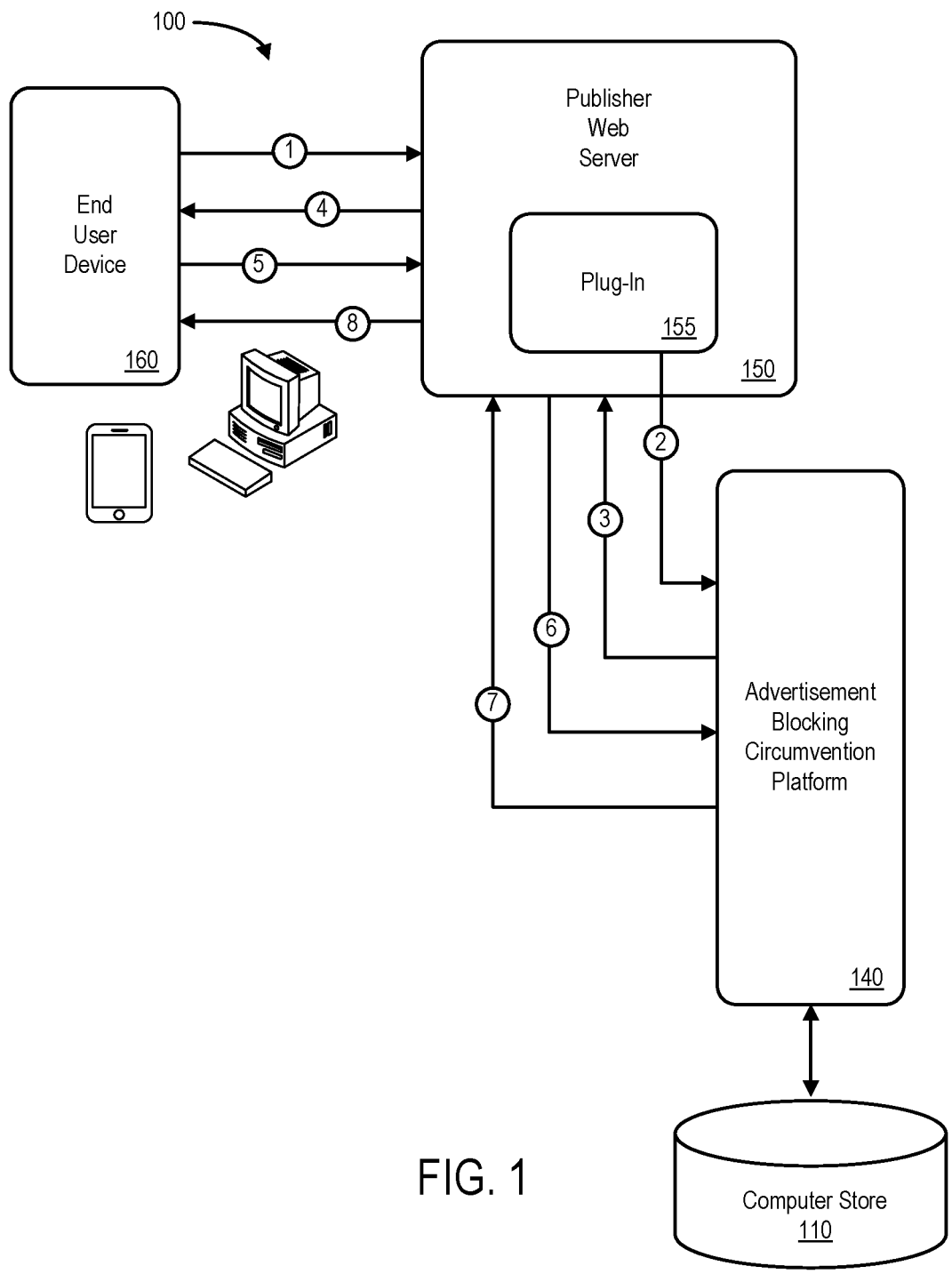
FIG. 1 is a high-level block diagram of a system according to some embodiments.

It would be desirable to provide systems and methods to automatically circumvent advertisement blocking associated with a computer network. FIG. 1 is a high-level block diagram of a system 100 according to some embodiments of the present invention. In particular, the system 100 includes an advertisement blocking circumvention platform 140 that may access information in a computer store 110 (e.g., storing a set of electronic records representing advertising content). The advertisement blocking circumvention platform 140 may also exchange information with a publisher web server 150 that communicates with an end user device 160 (e.g., by communicating with user browsers and smartphones via a firewall). According to some embodiments, a plug-in 155 installed at the publisher web server 150 may facilitate advertisement blocking circumvention. Note that the advertisement blocking circumvention platform 140 and/or other elements described herein might be associated with a third party, such as a vendor that performs a service for an enterprise.

The advertisement blocking circumvention platform 140 might be, for example, associated with a Personal Computer ("PC"), an enterprise server, a server farm, and/or a database or similar storage devices. According to some embodiments, an "automated" advertisement blocking circumvention platform 140 may help server advertising content from the computer store 110 to visitors of a web site hosted by the publisher web server 150. As used herein, the term "automated" may refer to, for example, actions that can be performed with little (or no) intervention by a human.

As used herein, devices, including those associated with the advertisement blocking circumvention platform 140 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The advertisement blocking circumvention platform 140 may store information into and/or retrieve information from the computer store 110. The computer store 110 might, for example, store electronic records representing advertising content, visitor statistics, etc. The computer store 110 may be locally stored or reside remote from the advertisement blocking circumvention platform 140. Although a single advertisement blocking circumvention platform 140 is shown in FIG. 1, any number of such devices may be included. Moreover, various devices described herein might be combined according to embodiments of the present invention. For example, in some embodiments, the advertisement blocking circumvention platform 140 and computer store 110 might be co-located and/or may comprise a single apparatus.

According to some embodiments, the system 100 may automatically circumvent advertisement blocking. For example, at (1) the publisher web server 150 may receive a web page request from the end user device 160 via a communication network (e.g., the Internet). For example, a user might use his or her end user device 160 to request a newspaper homepage. At (2) the plug-in installed 155 at the publisher web server 150 may arrange for information about the web page request to be transmitted by proxy to the advertisement blocking circumvention platform 140. At (3), responsive to receiving the information about the web page request, the advertisement blocking circumvention platform 140 may transmit to the publisher web server 150 information including an "invalid" Uniform Resource Locator ("URL") resource address. The URL resource address may be "invalid," for example, because it does refers to an image or other file type that does not exist at the publisher web server 150.

At (4), the publisher web server 150 may transmit to the end user device 160 a data package including the information about the invalid URL resource address and receive from the end user device 160 a resource request including the invalid URL resource address at (5). For example, the end user device 160 may have requested the image that doesn't actually exist at the publisher web server. At (6), the plug-in 155 at the publisher web server 150 may arrange for information about the invalid URL resource address and a publisher identifier to be transmitted to the advertisement blocking circumvention platform 140. Responsive to receiving the information about the invalid URL resource address, the advertisement blocking circumvention platform 140 might transmit to the publisher web server 150 a message including advertising content at (7). The advertising content may have, for example, been retrieved from the computer store 110. At (8), the publisher web server 150 may transmit to the end user device 160 a response to the resource request including the advertising content such that the advertising content will be delivered via the end user device 160. According to some embodiments, a single advertisement blocking circumvention platform 140 may support a large number of publisher web servers 150 (e.g., associated with many different publishers, web sites, content providers, etc.).

Figure 2:
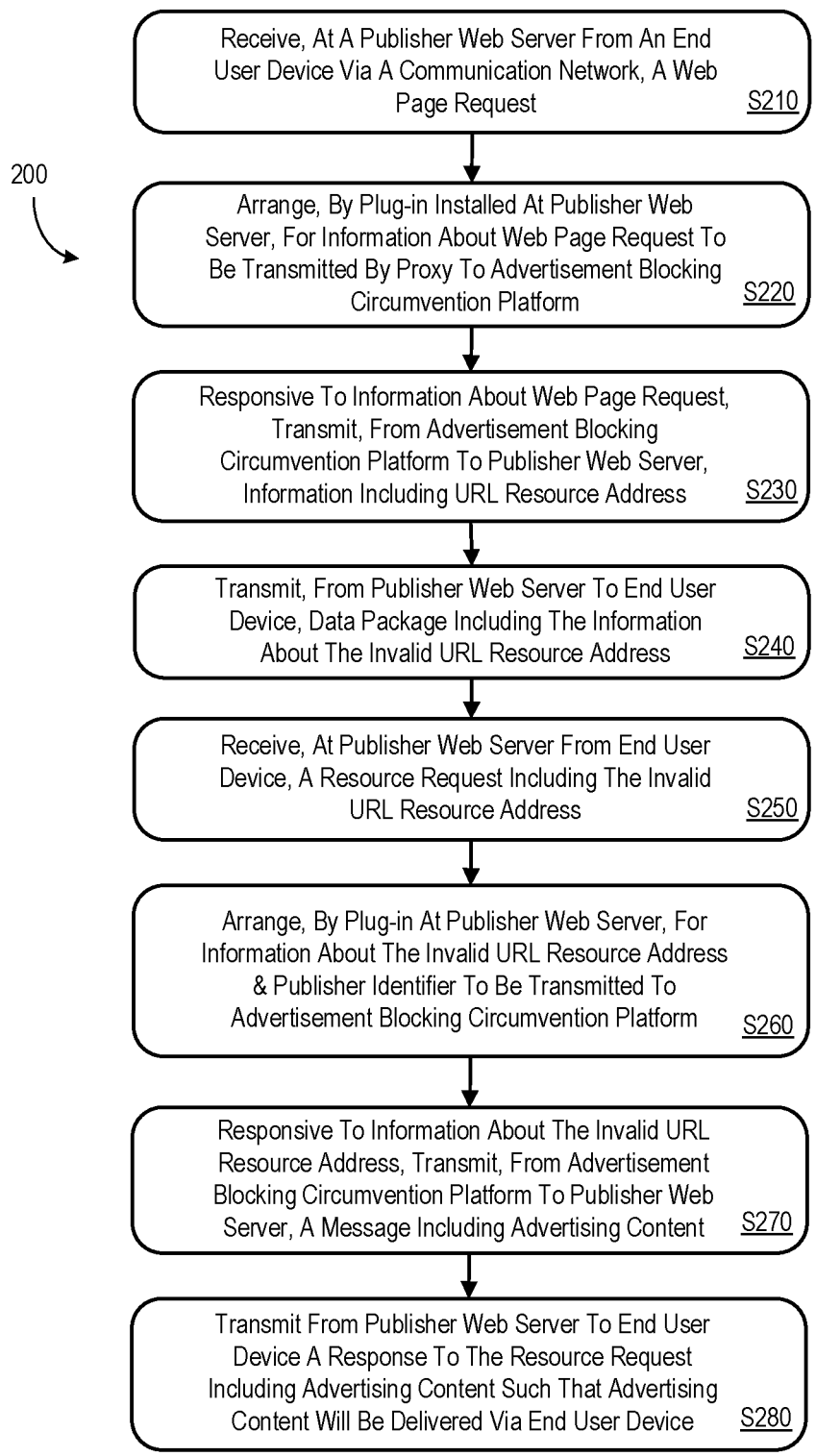
FIG. 2 illustrates a method according to some embodiments of the present invention.

Note that the system 100 of FIG. 1 is provided only as an example, and embodiments may be associated with additional elements or components. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a publisher web server may receive from an end user device a web page request via a communication network, such as the Internet. At S220, a plug-in installed at the publisher web server may arrange for information about the web page request to be transmitted by proxy to an advertisement blocking circumvention platform. Responsive to receiving the information about the web page request, the advertisement blocking circumvention platform may transmit to the publisher web server at S230 information including an invalid URL resource address.

At S240, the publisher web server may transmit to the end user device a data package including the information about the invalid URL resource address. At S250, the publisher web server may receive from the end user device a resource request including the invalid URL resource address. According to some embodiments, this invalid URL resource address does not result in transmission of an error message to the end user device. Instead, at S260, the plug-in at the publisher web server may arrange for information about the invalid URL resource address and a publisher identifier to be transmitted to the advertisement blocking circumvention platform.

Responsive to receiving the information about the invalid URL resource address, the advertisement blocking circumvention platform may transmit to the publisher web server a message including advertising content at S270. At S280, the publisher web server may transmit to the end user device a response to the resource request including the advertising content such that the advertising content will be delivered via the end user device. According to some embodiments, the response to the resource request transmitted from the publisher web server to the end user device embeds the advertising content (e.g., into an image file, a video file, an audio file, and/or an executable file).

According to some embodiments, at least one of the publisher web server and advertisement blocking circumvention platform might be associated with a cloud based computing service. For example, a Content Delivery Network ("CDN") server (if a publisher uses one) might comprise or be otherwise associated with a "publisher web server" (e.g., because the publisher rented the service) and this might include any type of service specialization, including full server rental vs. geo-distributed hosting for static files.

Note that some advertisement blocking detection techniques may employ an "element decoy." For example, a system may use JavaScript to insert a Hyper-Text Markup Language ("HTML") element into a Document Object Model ("DOM") with a non-zero height and width and class or id attribute set to a known Easylist-blocked value. The system may then wait a relatively short period of time (e.g., less than a second) and check if the element has been hidden (e.g., by having its height or width set to zero or by being made invisible with a Cascading Style Sheet ("CSS")). If it is hidden, the system might assume that some advertisement blocking is present.

Another approach might be to use an "external resource decoy." In this case, the system may include a known Easylist-blocked external resource in a web page, such as a JavaScript named "advertising.js", and having this script create a specific variable like "var AdBlock=false;". the system may then wait a relatively short period of time (e.g., less than a second) and checking if the AdBlock variable has been defined. If the variable has not been defined, the system might assume that some advertisement blocking is present.

As still another approach, the system may use a "fake advertisement object check." Note that some AdBlock plugins may seek to emulate certain common advertisement or tracking related JavaScript objects, such as those created by Google Analytics®. They do this because certain publisher websites may rely on these objects to function correctly. The AdBlock plugin blocks the real objects from being created, and instead creates fake similar objects to trick a website into thinking the real objects exist. The system may look for the presence of such fake objects, and use their existence to detect the presence of advertisement blocking.

Some advertisement blocking circumvention approaches described herein may utilize "domain switching." For example, AdBlock often blocks the domain that advertisements load from. It may therefore be possible to circumvent AdBlock by frequently switching out the domains that advertisements are served from. This may ultimately be a weak technique, because AdBlocker could block all third party domains by default (which may completely defeat this technique).

Another approach to advertisement blocking circumvention according to some embodiments described herein is "pattern switching." For example, AdBlock might block specific patterns in URLs or the HTML used in advertisements. It may therefore be possible to circumvent AdBlock by frequently changing these patterns. However, since all third party domains can be blocked, pattern switching by itself might not ultimately circumvent AdBlock. In combination with other circumvention techniques, however, the approach can be strong and useful.

In order to effectively switch patterns in URLs, HTML, and/or domains, the JavaScript and/or HTML code published on a publisher's page might need to be updated on demand. This might be done, for example, manually by having someone contact the publisher and provide them with updated code (which can be a very labor intensive process). According to some embodiments described herein, a system may use an Application Programming Interface ("API") that the publisher can install to automate this process. For example, ready-made plug-ins for popular platforms, such as WordPress and Drupal, may be provided and generic implementations in various programming languages can be generated for publishers on other platforms. Once the plug-in is set up, all updating of the code can be pushed to publisher websites automatically on demand.

Some embodiments described herein may load an advertising payload via one or more images. Note that AdBlock can block all requests for certain types of content by default. For example, most advertisements are loaded as JavaScript content, and AdBlock can block all JavaScript content. To address this, a way to load an advertisement payload (including, but not limited to, HTML, JavaScript, CSS, etc.) embedded in images may be provided. The system may then use, according to some embodiments, the HTML5 Canvas element to decode these images, and retrieve the HTML, JavaScript, CSS, etc. that was embedded within the image. Note that AdBlock might block all JavaScript on a website without causing too much damage, but blocking all images for a website will make may sites practically useless, and, as a result, this approach may be a strong technique for advertisement blocking circumvention.

Some embodiments described herein may also utilize a "first party via proxy" technique. For example, AdBlock may block all calls going to third party websites, but such an approach may be defeated by loading advertising content via a publisher's website domain. To accomplish this, the publisher may configure their webserver to proxy certain web requests to an advertisement blocking circumvention server. This may create an indirect connection between the end user running the AdBlock plugin with the advertisement blocking circumvention entity server, but which cannot be distinguished from any other similar web request to the publisher's webserver. This can make it impossible for AdBlock to categorically block such requests and may represent a very strong technique.

Moreover, some embodiments of the present invention may evade specific URL blocks. For example, when loading assets via any web request, even if it is first party in nature, it may need to use a specific URL. This specific URL can be blocked, so the system may need a way to change these URLs on demand. In order to accomplish this, a system may have the proxy server configured in such way that all "invalid" requests that would normally result in a page-not-found (404 Error) response, are automatically sent by proxy to the advertisement blocking circumvention entity server. In this way, when loading images on a typical publisher webserver, the system can load the image via any image URL that doesn't exist on the publisher's website. Such an approach creates an unlimited amount of potential URLs for the system to use, which cannot be blocked by any other means than to block all images on the website (which, in turn, may render the website useless to the end user). Note that some publisher websites loads images without the typical image suffixes (png, jpg, gif, etc.). Such websites might need to have a customized proxy implemented to address this issue.

Some embodiments described herein combine multiple techniques to create a very strong advertisement blocking circumvention product. The system may load advertising content, embedded in images, via first party proxy services set up on a publisher's web site, using would-be "page-not-found" image URLs, having a payload that employs pattern switching as necessary. The product may be set up by a publisher installing an appropriate API plug-in and configuring the proxy server in any of the ways described herein.

Figure 3:
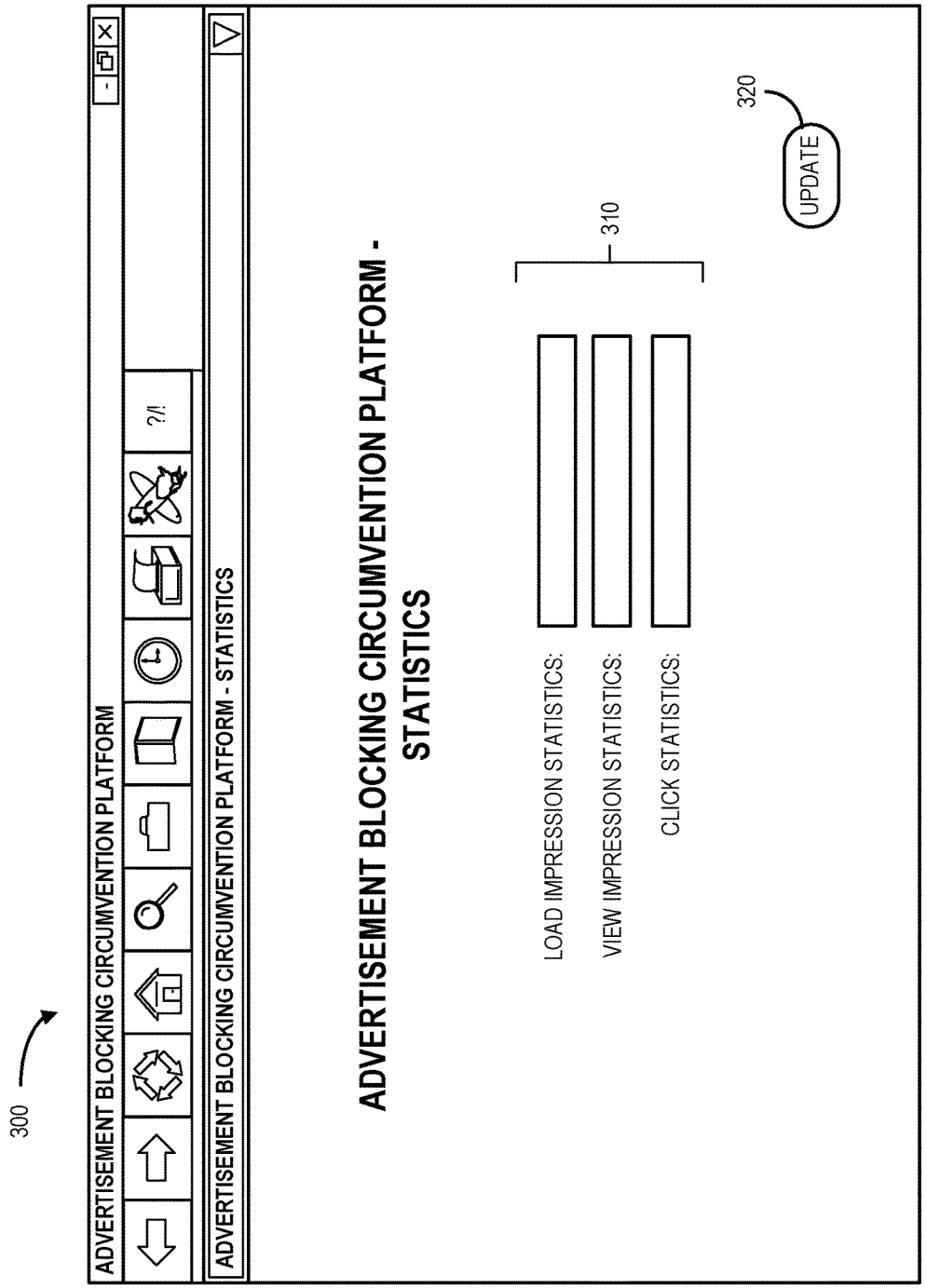
FIG. 3 illustrates an exemplary statistics display that might be associated with various embodiments.

According to some embodiments described herein, an advertisement blocking circumvention platform may collect load impressions and view impressions by loading tracking images over the same proxy described herein. Moreover, the system may collect click statistics by counting direct clicks hitting the server—all clicks on advertisement blocking circumvention entity advertisements may traverse the server before going to the advertiser behind the clicked advertisement. For example, FIG. 3 illustrates 3 illustrates an exemplary statistics display 300 that might be associated with various embodiments. In this example, the statistics display 300 includes an area 310 that provides load impression, view impression, and click statistics that can be updated via selection of an icon 320 by a user when desired.

Some embodiments described herein rely on JavaScript being available in the browser. Some new AdBlocker products may enable the partial or complete destruction of JavaScript functions available in the browser. It might therefore be possible for such a plugin to defeat the some of the circumvention techniques described herein (e.g., by destroying the HTML5 Canvas functionality or simply disabling JavaScript entirely). This would break some functionality on most publisher websites, but this may be considered an acceptable tradeoff to advertisement blocking providers.

To avoid such a result, some embodiments of the present invention may create code that runs server-side on a publisher's website and inserts content into the publisher's website HTML before it is sent to the client (e.g., an AdBlock user). The code inserted may be, for example, HTML and/or CSS in places specified by regular expressions. The HTML and/or CSS may, according to some embodiments, include images that point to URLs that do not exist on the publisher page. Requests for the non-existent images may be sent by proxy to an advertisement blocking circumvention platform (e.g., using any of the types of proxy implementations described herein). The server may then respond with direct advertisement images, which can then displayed to the end user. Note that the system may still be able to track impressions by counting proxy requests to the servers, and clicks, by any of the means as described herein, but might not be able to count view impressions (as these might require JavaScript). As a result, the system might not restore JavaScript functionality but can still show advertising content by inserting non-existent image URLs into HTML before the HTML is sent to the client. The non-existent images may then be sent by proxy to an advertisement blocking circumvention platform, which will yield advertising content back to the client. The resulting advertisements might still be subject to blocking by patterns, but some embodiments may defeat such blocking attempts as described herein (and, as a result, the advertisements may be shown even if an advertisement blocker completely disables JavaScript).

According to some embodiments, an ad-service may be launched to display advertisements for all users. The advertisements might, for example, be delivered to a publisher's website by manually giving an agent of the publisher a JavaScript snippet that he or she publishes on the site. This JavaScript might, for example, load advertisement content from pre-determined servers and display it on the publisher's website. Being a new service, it might not be blocked by AdBlockers, since the domain and HTML in the JavaScript snippet was not on Easylist, and the advertisements may be displayed even when an AdBlocker is active in the browser.

Eventually, Ad-blocks may specifically target the advertisements by adding them to Easylist, effectively blocking the advertisements from publisher's websites. This may happen, for example, when the system serves all of the advertisements from the same domain. To avoid this, support in the system may be added to serve advertisements from generic domains (called serve domains), in order to be able to continue to serve advertisements to AdBlocker-traffic on publisher sites. Such an approach may start manually giving out new JavaScript code snippets to publishers, in order to again be able to target their AdBlocker-traffic with advertisements. Moreover, the system may continuously replace publisher JavaScript code manually, but this may become a chore both for the system and for publishers. Further, the window of time the serve domains can be in use before they are added to Easylist may become shorter and shorter.

According to some embodiments, a WordPress or similar plug-in may be created that any publisher who uses the WordPress platform can install. This plug-in lets the Publisher—after entering a set of API credentials—have the JavaScript code be automatically updated whenever the system changes the serve domain. The system may also implement an API that publishers who do not use WordPress can utilize to create custom code to interface with, and achieve the same net effect as, what the WordPress plug-in offers. Such a system may also start to eventually see blocks targeting not just the serve domains, but also the URL-patterns in the JavaScript code. This may prompt the system to update the API and WordPress plug-in to support changing all the URL-patterns in addition to serve domains.

Note, however, that an Easylist administrator may begin using a new blocking strategy, wherein they have compiled a list of all publishers that they know about inside Easylist. With such a list, they can now afford to be more aggressive using blocking patterns against these publishers. Without the compiled publisher list, such aggressive blocking patterns might block other non-related JavaScripts on the web which Easylist may prefer to avoid. By compiling such a list Easylist can help limit the most aggressive blocks against only the targeted publishers. This blocking strategy exposes a potential flaw in some approaches to JavaScript circumvention technology: the system can be effectively shut down (with no recourse) if Easylist decides to categorically block all JavaScript from loading via remote URLs. With this strategy of targeting blocks specifically aimed at specific publishers, an advertisement blocking platform could whitelist all "non-ad" JavaScript URLs. This would effectively block the system and any other third party advertiser on these publisher sites.

A new strategy might be implemented to meet this situation. According to some embodiments, the new strategy might meet the following criteria:
  it might not be possible for Easylist Admin to categorically block it by means of domain, URL-pattern, and/or HTML-pattern detection; and
  it might be possible to mass-distribute the approach to a substantial number of publishers (that is, the approach may scale).

Some embodiments may work as follows for publishers that want to display advertisements only to entities that are using advertisement blocking:
  1. System servers may host an API that offers advertisement content to connecting API clients (publisher websites).
  2. The publisher's server may use a plug-in which connects to an API to pre-fetch advertisement content, which is then stored locally. This can be content in the form of image data, video, text, html, JavaScript and/or other mediums.
  3. When a visitor loads the publisher's website, the plug-in intercepts the final HTML data and injects a predetermined advertisement. This may be done, for example, by targeting specific patterns in the publisher's HTML data and inserting the advertisement content before, after, or/and inside the targeted HTML element.
  4. In addition to the advertisement content, the plug-in may publish "decoy" elements in the HTML that are known to be targeted for destruction by AdBlocker. If neither of the decoys is destroyed, the plug-in will hide the advertisement from view. However, if one or more of the decoys are destroyed, the plug-in may let the advertisement remain visible.

As a result, the advertisement is now loaded as first party content on the publisher's website and is no longer subject to categorical third party blocking by Easylist. It is still possible for AdBlocker to block it using HTML patterns, but this may require separate blocking rules for each publisher, and it cannot be categorically blocked. When a simple block is added to Easylist, it may be defeated, and the plug-in running on the publisher's website may update the HTML (and, consequently, circumvent the block). Note that even if all JavaScript is completely blocked from loading, the advertisements will still not be blocked because they are inserted into the source HTML code. Thus, some embodiments described herein may use such techniques to serve advertisement to both AdBlocker traffic and non-AdBlocker traffic on a Publisher website or the system may instead limit service to AdBlocker-only traffic.

Some embodiments described herein may provide solutions that are scalable across the web. For example, embodiments may be installed and implemented quickly on thousands of publisher websites and provide publishers with an effective solution to monetize AdBlocker traffic at high Cost Per Thousand Impressions ("CPMs"). In addition, some of the techniques described herein may provide a long term solution instead of a short term fix. Thus, publishers may use the technologies/methods described herein to: run advertisements (e.g., the system may provide the advertisers and advertisements for publisher to run on their website; and/or run their own sourced advertisements (e.g., publisher may use advertisers and advertising sourced by themselves). Both of these scenarios may use the same technologies/methods in order to run and display the advertisements. The only difference is the party that sources the actual advertising.

Some approaches may utilize server side injection and/or a user device configured to display by default both an advertisement and an alternative advertisement (and the executable code may inhibit display of the alternative advertisement upon finding that the user device does not run advertisement blocking software). In some embodiments, a served document comprises an additional alternative advertisement that is embedded in the document in a manner that is undetectable by the advertisement blocking software (and, upon detecting that the default advertisement was blocked, executable code may cause the user device to display the alternative advertisement). In some embodiments, a document may specify that a default advertisement and an alternative advertisement are both displayed to begin with. In such embodiments, if the executable code finds that the default advertisement was blocked, it might do nothing and thus allows the alternative advertisement to be displayed. If no advertisement blocking is detected, the executable code may then inhibit the alternative advertisement. In still another embodiment, the default advertisement may be embedded in an undetectable manner in the first place, in which case the document does not comprise the executable code or the alternative advertisement. This configuration may be useful, for example, when a single entity serves as both content provider and advertisement provider, or when advertisements are fetched in a server-side configuration, as opposed to client-side configuration. In still other embodiments, a content server may use such an undetectable format to embed the originally-displayed advertisement in the document. In these embodiments, the document typically does not comprise code or an alternative advertisement. Instead, a user device may receive the document with the embedded advertisement from the content server and display it to the user. In some embodiments, a system may mitigate advertisement blocking by simultaneously serving two advertisements for the same location in a given document: (1) a regular advertisement and (2) an alternative advertisement. The alternative advertisement may be formatted in a manner that is undetectable by advertisement blocking software, such as by using a dynamic structuring scheme. By default, both advertisements may be displayed. In this embodiment, code may check for the correct display of the regular advertisement (unlike the previous embodiments, in which the code checks for improper display of the regular advertisement). If the regular advertisement is found to be displayed correctly, the code may inhibit display of the alternative advertisement (and, thus, allow the regular advertisement to be displayed). Otherwise (i.e., if the regular advertisement was blocked), the code may do nothing and allow the alternative advertisement to be displayed.

Such approaches may make it useless for advertisement blocking software to evade the tests of the code: an evaded test (i.e., a failure of the code to detect advertisement blocking) will simply cause the code to refrain from inhibiting the alternative advertisement, which is against the original intent of the advertisement blocking software.

Some embodiments described herein may be associated with HTML pattern "fighting." For example, in some embodiments an advertisement may be displayed with a digital document, and the alternative advertisement may be embedded in the digital document using a format that prevents blocking software from detecting the alternative advertisement. Embedding the alternative advertisement may include repeatedly modifying an attribute of the alternative advertisement in the digital document (so as to prevent detection by the blocking software).

Some embodiments described herein provide advertisement blocking circumvention technology. Embodiments may retain at least basic functionality on a publisher's website, despite attempts from advertisement blocking providers. To do this, the system may intertwine advertisement content with the publisher's own content. The two may be, according to some embodiments, as mechanically indistinguishable from each other as possible. The system may achieve this by providing publishers an API which they will use to create a bridge between the system and their own servers. The publishers may essentially run their own ad-server locally—which then is served as first party content that, consequently, is difficult to categorically block. By intertwining the system and the publisher's own content (and serving it from the same source), embodiments may make it difficult to mechanically distinguish the two, which means categorical blocking of advertisement content may be impractical. By inserting advertisement units in the publishers source HTML before it reaches the consumer, the system may help ensure that it is able to provide basic functionality. This is not to say that custom filters cannot be crafted by the advertisement blocking entity that targets the units (but these filters might be defeated on the system side because they are not categorical blocks). Note that many publishers rely on caching pages. An ad-server, however, may rely on executing each time a visitor requests a web page. This means that a publisher hosted server-side ad-server may not be useful since it will only be queried once each time the cache expires. The results are then cached, and then served to every subsequent visitor until the cache expires. In contrast, a publisher who does not rely on caching may be able to leverage embodiments as a fully server-side ad-server. For a publisher that employs page caching, embodiments may create a minimal ad-server contained within inline JavaScript. This may reduce the caching problem since the client will execute the JavaScript locally on each page request. Note that inline JavaScript is a categorically blockable resource, so units might not rely on it for basic functionality.

In some embodiments described herein, no matter what an advertisement blocking entity does, the system may make it difficult to categorically block units. Note that such blocks are essentially patterns that, when matched, trigger blocking actions. The advertisement blocking plug-ins may need to sift through and apply these blocking patterns on all of the data a website serves. The challenge for them consequently is to pass through all non-advertisement content and block only ad-content. This brings forward three strategic principles.

The first strategic principle is that units may be able to maintain basic functionality without relying on any third party resources. Note that all third party resources (JavaScript, CSS, Images, etc.) may be susceptible to become categorically blocked, so the unit may avoid relying on those.

The second strategic principle is that units may maintain basic functionality without relying on inline JavaScript. Inline JavaScript blocking is currently not supported in the primary advertisement blocking plug-ins, but it is supported by other browser plug-ins, and embodiments may assume it will be part of advertisement blocking in the future.

The third strategic principle is that units may attempt to leverage inline JavaScript and third party resources. Note that it may be difficult for a system to perform geographic and device targeting server-side on any hosts that cache their pages. It may also be difficult to track unit loads and views, and page loads and views without making calls to third party resources. Consequently, embodiments may use both inline JavaScript and third party resources as much as possible. The system, however, may expect that these services will suffer blocking attempts, but since units may maintain basic functionality without these services, these blocking attempts might eventually be abandoned since maintaining constant blocking of the third party resources is an extremely laborious and impractical task. This may leave the system with an ability to fully leverage targeting and tracking intelligence on all publishers regardless of cache.

According to some embodiments, an API may run as a separate Tornado instance, and implement the following methods:

To standardize API embodiments, the system can choose the JSON API standard. Every API method may require the calling website to identify itself with the following header arguments:

```
int X-WebsiteID
string X-ApiKey (32 chars length)
Successful Response Payload
{
"data": {
    // payload data
}
}
Successful Response Status Code
200 OK
Unsuccessful Response Payload
{
"errors": {
"code": str application specific status code
"status": str HTTP Status Code, // decide to add it or not
"detail": str human-readable explanation
}
}
Unsuccessful Response Status Codes
400 Bad Request
401 Unauthorized
500 Server Error
get-ad-server
Request body
None.
Server response
Return the following data:
All the inline JS described under Plugin section.
List of units, each item containing:
Source targeting (regex or similar)
Unit CSS (responsive CSS etc.)
Unit template (html with variable placeholders, e.g. [[ad_id]])
Unit is AdBlocker-only, yes or no
Callback domains, and callback URL patterns
```

Note:
the system may use more end-points, but this is the only one for now.

In some embodiments, a "generation" phase may, for example, happen on a server locally in a cron job. This process may be based on an already existing ranker in Model/Ranker.py. It may build lists of advertisements with computed weight per advertisement, which the display logic uses to draw. A "selection" phase may use ranker data to pick which advertisements to show in a widget on the publisher's site. This process may take place inside a plug-in on the publishers own site. Consequently, performance optimization here may be important—the system may avoid consuming too much CPU or RAM on the publisher's server.

According to some embodiments, display logic can be divided into three layers which face different sets of threats from an advertisement blocking entity. In the layer descriptions of Table I, "ad-server" may refer to a system which contains a pool of advertisements it can select for display (e.g., based on geographical variables of the consumer).

"Layer 1" may be associated with basic functionality. Consider, for example, an ad-server that runs server-side. It inserts its advertisements into the source HTML of the publisher's page, before delivery to the consumer. This layer will always be used regardless of advertisement blocking activity and potential caching issues. "Layer 2" may be associated with inline JavaScript. Consider, for example, a minimalistic ad-server implemented in inline JavaScript. This may provide ad-server intelligence for publishers who use caching systems, and also in the event that Layer 3 has been disabled by advertisement blocking. "Layer 3" may be associated with third party resources. By calling third party JavaScript resources, the system may provide additional ad-server intelligence, and consumer activity tracking. This layer is the most susceptible to being blocked by advertisement, but is not critical for basic functionality.

TABLE I

Layers

| Layer | Critical for Basic Functionality? | Can Layer be Temporarily Blocked? | Can Layer be Categorically Blocked? |
|---|---|---|---|
| Layer 1 | Y | Y | N |
| Layer 2 | N | Y | Y |
| Layer 3 | N | Y | Y |

The interface might be implemented using a simple configuration page with the following inputs and buttons: Input: Website ID; Input: API Key; Checkbox: enabled or not; and/or Submit: Save & Refresh. When the submit button is pressed, the input values should be persisted using appropriate storage methods of the CMS. The plugin should also manually start the API synchronization process when the submit button is pressed. According to some embodiments, a plugin may have a method that calls an API get-ad-server method, and then synchronizes itself with the returned data. This process may, for example, take perhaps minutes to finish. According to some embodiments, the plugin may make the host CMS use its cron-system to call the plug-in synchronization method (e.g., once per hour). According to some embodiments, a plugin may make a get-ad-server API call, and receive a list of units to insert and where to insert them. This is carried out, and advertisements are taken from the default ranker to populate each template. Populating the templates with real advertisements might comprise an important step, because the system wants to make sure that even if JavaScript is entirely disabled, these advertisements are still displayed. Some embodiments might be associated with inline JavaScript data (that the plug-in should output in the source of the publisher's page) and/or the following:

```
Ad data
{"ad_id": [ad_text, image_url, ad_url]}
Should only include advertisements that are present in the ranker data.
Ranker data
{
"country_id":
{
"device_id":
{
    "ad_id": [tickets, adv_site_id, url_id, grace],
    ...,
},
...,
},
```

-continued

```
...,
"default":
{
    "device_id":
        "ad_id": [tickets, adv_site_id, url_id, grace],
        ...,
    },
},
}
```
Should only include country specifications for countries we have advertisements specifically targeted for. "Default" is for all countries not specifically listed.
Grace list
[ad_id, ad_id, ...,]
This is a list of advertisements in gracing, needed to limit the amount of grace advertisements shown per unit.
Advertiser site to advertisement list
```
{
    "advertiser_site_id": [ad_id, ad_id, ad_id, ...,],
    ...,
}
```
This may limit the amount of advertisements shown from the same advertiser.
Ad URL to advertisement list
```
{
    "ad_url_id": [ad_id, ad_id, ad_id, ...,],
    ...,
}
```
This may limit the amount of advertisements shown going to the same URL.

Note that some embodiments may do device detection with wurfl. Moreover, some embodiments may guess the country of the user by looking at the navigator.language JS object. This might not be entirely accurate as navigator.language for a number of reasons: it is not equal to the country of origin; it is not implemented exactly the same in all browsers; and/or it really just means the preferred language set in a user's browser or system. An alternative method for determining a user's country without ability to do it server-side (due to caching) and without ability to do it via an Ajax request (due to advertisement blocking) would be to include an inline IP to Country DB in JS. This is technically possible, but a full IP-Country DB is about 3 MB large, and a slimmed down version with just the most important countries is still 300 KB. This may represent an unacceptable amount of bytes to put inline in a publisher's html source. Consequently, in a cached and blocked scenario the system may guess a country based on the preferred language. The typical American, Canadian, Australian, etc. users may have the expected preferred language in his or her browser/system, which will make this lookup method somewhat accurate.

According to some embodiments, the inline JS to be executed might be associated with this example:
 For a unit that is for advertisement-only traffic: hide all units; detect if advertisement blocking is present: if yes, show unit and if no, quit; use inline JS ranker method to populate the unit with country/device targeted ads; and call remote scripts for load and view tracking.
 For a unit that is not for advertisement blocking-only traffic: use inline JS ranker method to populate the unit with country/device targeted ads; call remote scripts for load and view tracking.
Note that there may be two basic ways to detect if a website visitor is using advertisement blocking, and both approaches may have individual advantages and disadvantages. The system might only use one technique, but some embodiments may use both.

With an "element decoy" advertisement block detection technique, in the HTML of page, a DIV (the decoy) is inserted with >0 dimensions (e.g., 1×1 pixels), and given a class name known to be blocked in Easylist. Afterwards, set a JS timer to periodically call a function that checks the dimensions of the decoy DIV. This check might be, for example, carried out once per 250 ms for the first 1.5 seconds (giving up after that). If the dimensions are found to have been set to zero in this time, it is safe to assume an advertisement blocker is active. Note that this approach relies on an advertisement blocker's element-hiding features. The advantages may include: cleanliness (doesn't require any external calls); and the fact that advertisement blocking entities have been willing to mitigate this type of detection technique (because it is both harder to detect the technique and it would be impractical to add the necessary exception rules to neutralize the method). The disadvantages may include the fact that some advertisement blocking products do not enforce element hiding (because the rules are considered slow). Note that some users have disabled element hiding for the same reason. Still other advertising blocking products don't support element hiding because of technical device limitations (e.g., associated with iOS).

With an "external script decoy" advertisement block detection technique, a call may be made a known blocked script like "anywhere.com/advertising.js." In advertising.js, set a unique control variable like "var_nDBEsjkfu3f=1;". Then, use JS to wait a second for the browser to execute this script. Check if the control variable is defined. If it isn't, assume an advertisement blocker is present. Alternatively, it may be possible to avoid guessing how long it may take the browser to load the script, and instead load it as a XMLHttpRequest setting failure/success handlers on it to duplicate the logic. It should be noted that an advertisement blocker may differentiate between regular script inclusions and XHR, with script blocks being far more ubiquitous than XHR blocks. As a result, it may be harder to keep XHR based detection alive than regular script inclusion detection. An advantage of this approach is that it may be effective against a larger range of advertisement blocker implementations. A disadvantage of this approach is that it may often be pursued and blocked by an advertisement blocking entity, and thus require maintenance and monitoring.

Some embodiments are associated with Ajax calls that the system may attempt to make to a provided callback domain. These are subject to advertisement blocking—the Advertisement blocking entity may block these completely, to the point where it is impossible to unlock these even by changing the callback domain or by changing the URL patterns. Hence, some embodiments may endeavor to make the system able to operate without these callbacks, but able to leverage them if possible as they will add value to our service if they work. By way of example:
  http://example.com/load
  Arguments: widget_id, publisher website_id, ad_list
This makes the server register a load event has taken place. In a piggyback approach, when a user makes this Ajax-call, the system may perform an IP-to-Country lookup and return the country_code as the successful response. The system may then use this proper country in the Plugin instead of the less accurate Country-by-preference method. Note that ad_list is a list of the advertisements displayed in this particular case. For example:
  http://example.com/view
  Arguments: widget_id, publisher website_id, ad_list
This makes the server register that a view event has taken place. Note that the appearance of these two third party JavaScript callbacks may be subject to indefinite change as necessitated by advertisement blocking issues against them. As a result:
- domains will change;
- URIs will change, and never be directly indicative of their function as they are in the descriptions above;
- variable names will change;
- even variable values might change (encoding IDs as strings etc.);
- they might look completely different on different publishers; and
- arguments may be passed as GET or POST variables, or anything in between. Any pattern can be blocked so the system may remain completely flexible in this regard.

Consequently, no set format for what these will look like might be defined. To start, the system may let them all look and be uniform, but this will likely change as time goes on.

Table II is a list of possible ways an advertisement blocker might attack embodiments described herein. Note that attacks with a high collateral damage are less likely to be used. "High collateral damage attacks" might refer to, for example, attacks which are broad in nature in terms of the targeting applied and return false positives. As a result, "genuine" content and features of a website become blocked in addition to advertisements. This is not something an advertisement blocking entity wants to achieve, as it may make the advertisement blocking product ineffective for users (since users can't view desired content).

According to some embodiments, a system may operate a cluster of globally distributed proxy servers, which are configured to handle requests to publishers' domains. Note that a publisher may be required to point their domains to one or more IP addresses belonging to the system's proxy network. When a page request arrives at a proxy server, the following actions may be carried out:

1. Check if a certain "link keyword" exists in the URL.
   If yes: extract the link ID from the URL, and redirect the consumer to the corresponding advertisement URL.
   If no: go to next step.
2. Check if a locally cached copy of the requested resource exists on the proxy server, and that it has not reached beyond its maximum Time To Live ("TTL").
   If yes: serve the locally cached copy. Execution ends here.
   If no: go to next step.
3. Request a copy of the requested page from the Publisher's server.
4. Retrieve a copy of the advertisement HTML and supporting inline JavaScript tags to be served on this page from a subsystem existing on the local proxy server. This advertisement may be geographically targeted based on the consumers IP address, and further targeting based on consumer cookies may also be used.
5. Insert the advertisement HTML and inline JavaScript tags into the page HTML retrieved from Publisher's server.

TABLE II

List of Possible Attacks

| Attack | Result | Collateral damage | Counter Attack | Regain basic unit visibility? | Regain local targeting ability? | Regain remote targeting ability? | Regain tracking ability? |
|---|---|---|---|---|---|---|---|
| Block pattern in unit HTML and/or CSS | unit hidden | none | change HTML/CSS | yes | yes | yes | yes |
| Block by callback domain in unit HREF | unit hidden | none | change callback domain | yes | yes | yes | yes |
| Block all elements with a non-local HREF link | unit hidden | high | N/A, but could work around by using JS, but if JS is also blocked this is meaningless | maybe | maybe | maybe | maybe |
| Block inline JS by pattern | basic unit still visible and working but without country or device targeting | none | change JS | yes | yes | yes | yes |
| Block all inline JS | basic units still visible and working but without country or device targeting | high | N/A | yes | no | no | no |
| Block all callback domain | all tracking broken | none | change callback domain | yes | yes | yes | yes |
| Block all 3rd party domains | all tracking broken | low | N/A | yes | yes | no | no |
| Block all images on site | no images showing in ads | high | N/A | reduced to text only | yes | yes | yes |

6. Save a local copy of the resulting final HTML with advertisement on it on the proxy server. This may be saved specifically for different attributes like geographical consumer country or state origin. The cache will be saved with a configurable Time To Live ("TTL") value, at the expiration of which the cached copy will be deleted from the proxy server.
7. Send the final HTML to the consumer.

According to some embodiments, advertisement images and/or links may require special treatment. With respect to an advertisement image, an advertisement may make use of HTML Image tags and CSS Image references. In some cases, an advertisement is mechanically indistinguishable from publisher content. The proxy service may therefore be aware of how the publisher places images on their site. According to some embodiments, advertisement images will use the similar URLs and names as the Publisher's own. For example:

Publisher image: http://pub.com/uploads/images/big-airplane01.jpg

System image: http://pub.com/uploads/images/small-airplaneXYdn3.jpg

Images may change name automatically every time a resource is fetched from the publisher's server. This may make attempts by advertisement blocking software to block advertising using images by specific paths or URLs difficult. The advertisement images referred to will not exist on the publisher's server, but rather reside locally on the proxy server. When a consumer requests an image from the proxy server, the following may happen:

1. Check if the image exists locally.
   If yes: serve the image. This can be either an advertisement image or a Publisher image previously fetched from the Publisher's server.
   Execution ends here.
   If no: continue to step 2.
2. Request a copy of the requested image from the Publisher's server.
3. Save a local copy of the image on the proxy server. Since images seldom are changed, we will typically set a very high TTL on this image.
4. Send the image to the consumer.

With respect to an advertisement link, some advertisements may make use of HTML anchor tags (links). These advertisement links might, for example, all point to resources that do not exist on the publisher's server, e.g.:

http://publisher.com/somewhere04XYZ-777/somepage.html

As described herein, these advertisement links may be detected and a Link ID (777 in this example) may be extracted. The consumer who clicks on this link will be redirected to the corresponding advertisement URL.

If a publisher uses a geo-aware DNS service, it may be able to route visitors to the geographically closest proxy server. According to some embodiments, the system may operate proxy servers close to all major markets.

Note that an extension to advertisement blocker circumvention embodiments described herein may let a system load third party content on a website which, to the browser, appears as first party content. This may be a useful strategy to employ against advertisement blockers, which may be effective against third party content but ineffective against first party content (while an advertisement server can be more effective operating as a third party instead of a first party).

Consider the following 4-step list that describes some embodiments of the present invention:

Step 1 may be associated with configuration of the client webserver. In particular, the owner of the client website may agree to make a small configuration change to their webserver(s): for example, the owner may make it proxy all incoming requests for all common image files (URLs ending in .jpg, .jpeg, .png, or .gif) if the image file does not exist on the client's own website. Normally, these requests would generate a 404 webserver error (meaning resource does not exist) but after this change, the request for the image will instead be sent to a system controlled server. This forward happens between the client website and the system server, and may not be seen by the browser. It is called a "proxy redirect" and may include—apart from the URL of the requested resource—a number of different data strings known as "HTTP Headers." This additional data may include (but is not limited to) an IP address and user agent of the browser and the hostname of the client website. This extra data may be utilized in accordance with some embodiments described herein.

Step 2 may be associated with software on the client webserver. In particular, the owner of the client website may also agree to install certain software on their webserver(s). This software is usually referred to as a "plug-in." Clients using common Content Management Systems ("CMS") such as WordPress or Drupal may be offered pre-written plug-ins. Clients not using a common CMS may need to create their own equivalent software using implementation documentation provided by operators of any of the systems described herein. This software may automatically contact an API on the system servers, which may provide the caller with JavaScript to be published on the client's website. This JavaScript may be placed inline (directly in the source, not loaded in a separate file) on all pages where system advertisements are desired to be displayed. This JavaScript may contain functionality for:

detecting the presence of AdBlocker plugins on the browser;

loading images via HTTP requests;

getting the data of a loaded image via the browsers Canvas system;

steganography decoding algorithms for reading data embedded in images;

algorithms for placing advertisements in the client's HTML code; and a URL leading to a specific image resource which does not exist on the publisher's webserver, and consequently will be proxied to the system server. This URL may or may not contain an ID encoded using alphanumerical set by the system API described in Step 3.

Step 3 may be associated with a system API. In particular, the system API may be responsible for serving the JavaScript that the plugin software downloads to the client webserver in step 2. It may do this, for example, as a RESTful API. This may be done completely server side (and not live as a user visits the client website).

Step 4 may be associated with a system proxy image service. In particular, the system webserver may listen for incoming proxy requests for images. When it receives these, it may either extract an ID identifying which client website the request came from, or uses the proxy request provided client hostname (header: X-Forwarded-Host) which may also be used to identify the client. It may use the IP address of the browser to determine the geographical location of the browser user (header: X-Forwarded-For). It may use the user agent of the browser to determine the device (desktop, tablet or mobile) that the browser is on. With this information, it may generate a client-, country-, and device-targeted advertisement. This advertisement can consist of Control data, HTML, CSS and/or references to one or more images or video files. The image files referenced may be made to point to the clients own domain name that they serve their own images from. If the advertisement uses multiple images, these can be combined and placed in one big image on the system server. In this way, the browser might download just one big image rather than multiple smaller ones, which can boost network performance. Finally, the advertisement data—without images—may be encoded as a PNG or JPG image, using publicly available steganography technology. The resulting image file may then be returned to the client website's proxy request, and the client website in turn may return the image to the browser.

Consider, for example, an enumerated 6-step example flow that demonstrates how some embodiments of the system may work:

Step 1—A page is loaded on the client website. A person using a browser (the user) loads a page on a client website. He or she receives a page with the system provided JavaScript active within.

Step 2—The user's browser executes the system provided JavaScript. This JavaScript detects if an advertisement blocker is present and active. If it isn't active, nothing else happens. If it is active, the JavaScript may instruct the browser to load the first system proxy image, for example: /uploads/2015/06/hello.jpg. Note that the URI path and image name are arbitrary and can take almost any shape or form to make them indistinguishable from images belonging to the client website.

Step 3—The image request is proxied to the system server. Since this image doesn't exist on the client's own website, it gets proxied to the system server. The system server identifies which client website sent the request by examining the X-Forwarded-For header.

Step 4—The Advertisement is prepared and returned to the user. The advertisement may be prepared, taking the user's location, device information and the character of client website into consideration. The result may be encoded into an image and returned to the user's browser via the proxy chain connection. To the user—and consequently also to the AdBlocker—this looks like just another local image. Note this step may also be cached for a period of time, to reduce server load and improve performance.

Step 5—The Advertisement is decoded. The system provided JavaScript running in the user's browser decodes the returned image, extracting the Advertisement HTML and CSS.

Step 6—The Advertisement is displayed. The system provided JavaScript finally instructs the browser to display the advertisement, by using the provided control data to determine where to position it, inserting the advertisement CSS into the header section of the page, and the advertisement HTML into the desired location of the page.

Note that images used for the advertisement may be requested through the same proxy pipe as the initial image carrying the HTML and CSS. These images may also use arbitrary URLs, making them indistinguishable from the client website's own images (e.g., /uploads/2015/06/subzero.jpg.). The outgoing links in the advertisement can be made to look like links going to internal resources on the client page, but are also rigged by the system-provided JavaScript to redirect the user to the specific advertiser URLs if the user clicks on them. Note that advertisement blockers may be good at blocking third party resources from loading on websites. This includes JavaScript loaded from external domains, or even JavaScript loaded from the local domain but loaded as external JavaScript via a script "src" tag—in other words not loaded inline (inline means being directly output in the page HTML source code). Advertisement blockers may be good at blocking all types of other third party resources as well, like image files, video files, CSS files, etc. Some embodiments described herein may be effective against advertisement blockers because it may operate entirely without using any overt third party resources on the client website. This can deny advertisement blockers the ability to use the most common and effective blocking techniques.

An advertisement blocker might still attempt to block advertisements served using this technique in a few ways, such as by blocking image URLs. For example, an advertisement blocker might block the image URLs used by the proxy system. This might be defeated by changing the image URLs the system uses. The advertisement blocker will then be in a situation where it has to block an infinite number of URLs, which is unrealistic as it not only will be very ineffective but will also make the blocker slower and slower as the list of resources to block grows. The only alternative for an advertisement blocker is to block all images on a client website, but that may render the typical website inoperable for advertisement blocker users, so this is an unlikely response. Thus, advertisement blockers may be unable to categorically block advertising using this technique.

An advertisement blocker might also attempt to take a closer look at the proxy image URLs. Consider, for example, a "steganography" image which carries the advertisement HTML and CSS data. It isn't displayed anywhere as it visually looks like a grayscale collection of dots. It is downloaded by the initializing JavaScript, and then decoded into HTML and CSS. It can also carry JavaScript which is executed by an eval statement on the client website. The system server may identify this image by making sure a specific secret and continuously changing sequence of one or more characters are present in the image URL (e.g., /wp-content/uploads/2015/07/beautiful-peaks.jpg with a recognition sequence of an absence of character x and z in URL). Also consider, for example, an "imagepack" image which is collection of advertisement images combined into one large image. It can be beneficial to send multiple images like this instead of one by one, both for performance reasons and in the interest of giving the advertisement blocking entity less things to attempt blocks on. The system server may identify this image by making sure a specific secret and continuously changing sequence of one or more characters are present in the image URL (e.g., /wp-content/uploads/2015/07/nazareth.jpg with a recognition sequence that it contains at least one z). Also consider, for example, a "single advertisement" image which might comprise simple single advertisement images. The system server may identify this image by making sure a specific secret and continuously changing sequence of one or more characters are present in the image URL (e.g., /wp-content/uploads/2015/07/naxos-.jpg with a recognition sequence that it contains at least one x and no z).

An advertisement blocker might also attempt to block HTML patterns. Similar to image blocking, this is not a viable solution for advertisement blockers as the circumvention system may just make small changes to the HTML in system-generated advertisements to defeat the approach. The blockers thus may be unable to categorically block system-generated advertisements using this technique.

An advertisement blocker might also attempt blocking based on CSS rules and/or specific CSS instructions. Note that an advertisement blocker might not be able to categorically single out system-generated content this way (as some embodiments may change CSS instructions at will) and will invariably increase collateral damage—blocking non-advertisement content—to the point where the client website becomes unusable for the user.

Thus some embodiments described herein may provide an image proxy for images not found on the client website, for the purpose of being able to disguise advertisement images among a client website's own images, and being able to change the names of these proxied images at will. Moreover, some embodiments may automatically download JavaScript via API and/or use image steganography as a vehicle for advertisement transfer via image proxy that makes what would traditionally be third party resources become first party content. When combined, these approaches may create a scalable system for defeating advertisement blocking software reliably, and may allow clients to recover revenue streams.

Figure 4:
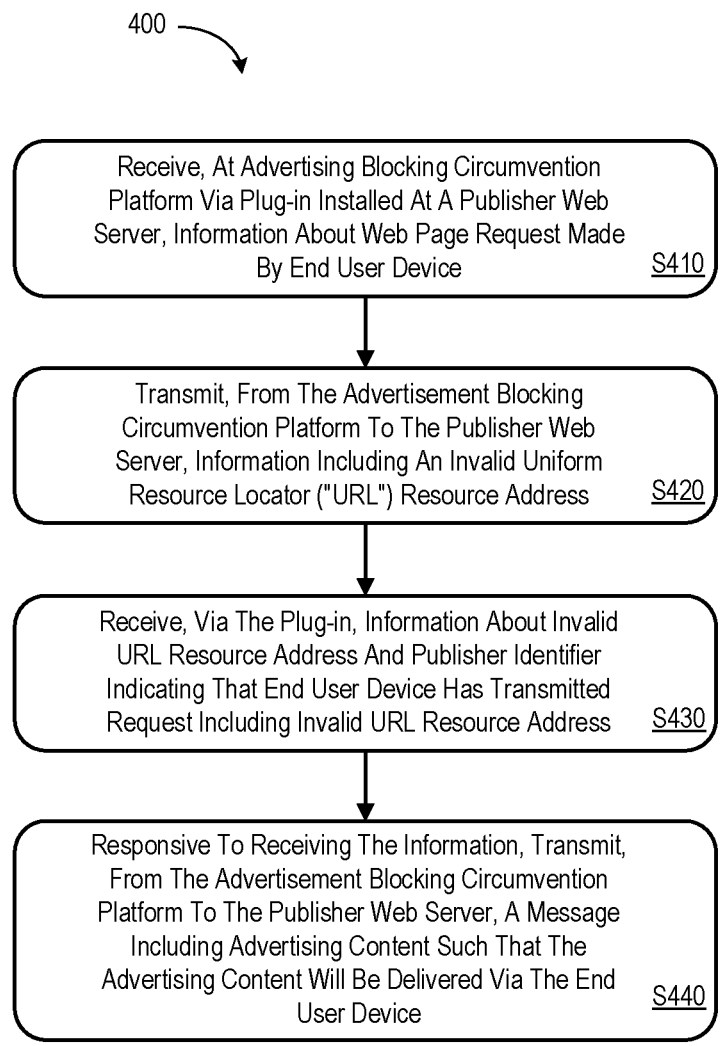
FIG. 4 illustrates an advertisement blocking circumvention platform method according to some embodiments of the present invention.

FIG. 4 illustrates an advertisement blocking circumvention platform method 400 according to some embodiments of the present invention. The method might, for example, be associated with the advertisement blocking circumvention platform 140 described in connection with the system 100 of FIG. 1. At S410, an advertising blocking circumvention platform may receive, via a plug-in installed at a publisher web server, information about a web page request made by an end user device. At S420, the advertisement blocking circumvention platform may transmit, to the publisher web server, information including an invalid URL resource address. At S430, the system may receive, via the plug-in at the publisher web server, information about the invalid URL resource address and a publisher identifier indicating that the end user device has transmitted a request including the invalid URL resource address. At S440, responsive to receiving the information about the invalid URL resource address, the advertisement blocking circumvention platform may transmit, to the publisher web server, a message including advertising content such that the advertising content will be delivered via the end user device.

Figure 5:
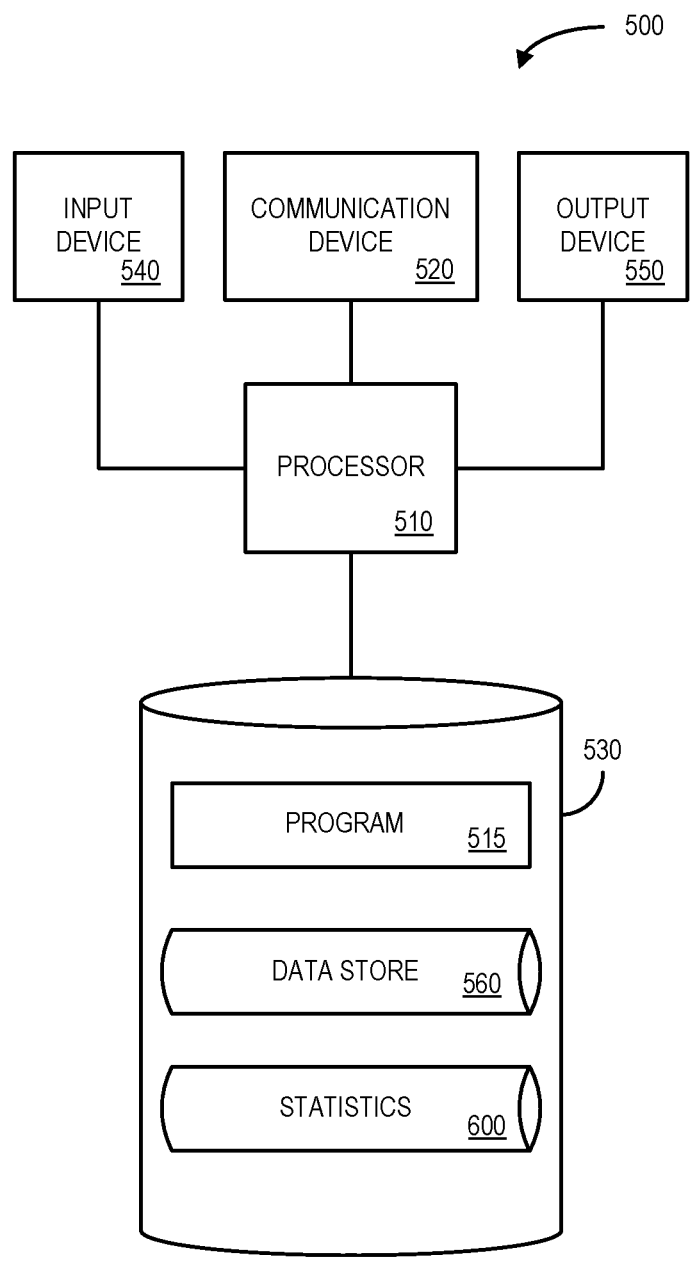
FIG. 5 is a block diagram of an apparatus in accordance with some embodiments of the present invention.

The embodiments described herein may be implemented using any number of different hardware configurations. For example, FIG. 5 illustrates a platform 500 that may be, for example, associated with the system 100 of FIG. 1. The platform 500 comprises a processor 510, such as one or more commercially available Central Processing Units ("CPUs") in the form of one-chip microprocessors, coupled to a communication device 520 configured to communicate via a communication network (not shown in FIG. 5). The communication device 520 may be used to communicate, for example, with one or more remote publisher web servers, advertisement blocking circumvention platforms, etc. Note that communications exchanged via the communication device 520 may utilize security features, such as those between a public internet user and an internal network of an enterprise. The security features might be associated with, for example, web servers, firewalls, and/or PCI infrastructure. The platform 500 further includes an input device 540 (e.g., a mouse and/or keyboard to enter information about advertisements, publishers, statistics, etc.) and an output device 550 (e.g., to output reports regarding system administration and/or performance).

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 stores a program 515 and/or a risk evaluation tool or application for controlling the processor 510. The processor 510 performs instructions of the program 515, and thereby operates in accordance with any of the embodiments described herein. For example, a publisher web server may receive from an end user device a web page request. A plug-in installed at the publisher web server may transmit information about the request to an advertisement blocking circumvention platform. The processor 510 may respond with information including an invalid URL resource address, and the publisher web server may transmit a data package, including the information about the invalid URL, to the end user device. The publisher web server may then receive from the end user device a resource request including the invalid URL, and information about the invalid URL may be forwarded to the processor 510. Responsive to receiving the information about the invalid URL, the processor 510 may transmit a message (including advertising content) and the publisher web server may transmit to the end user device a response to the resource request such that the advertising content will be delivered via the end user device.

The program 515 may be stored in a compressed, uncompiled and/or encrypted format. The program 515 may furthermore include other program elements, such as an operating system, a database management system, and/or device drivers used by the processor 510 to interface with peripheral devices.

As used herein, information may be "received" by or "transmitted" to, for example: (i) the platform 500 from another device; or (ii) a software application or module within the platform 500 from another software application, module, or any other source.

In some embodiments (such as shown in FIG. 5), the storage device 530 further stores a computer data store 560 (e.g., associated with advertising content, etc.) and a statistics database 600 (e.g., storing load impressions, view impressions, click statistics, etc.). Note that the databases described herein are only examples, and additional and/or different information may be stored therein. Moreover, various databases might be split or combined in accordance with any of the embodiments described herein. For example, the computer data store 560 and/or statistics database 600 might be combined and/or linked to each other within the program 515.

Thus, embodiments may provide an automated and efficient way to circumvent advertisement blocking associated with a communication network. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of advertising, embodiments may instead be associated with other types of advertisements.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A method to circumvent advertisement blocking associated with a communication network, comprising:
   receiving, at a publisher web server from an end user device via the communication network, a web page request;
   arranging, by a plug-in installed at the publisher web server, for information about the web page request to be transmitted by proxy to an advertisement blocking circumvention platform;
   responsive to receiving the information about the web page request, transmitting, from the advertisement blocking circumvention platform to the publisher web server, information including an invalid Uniform Resource Locator ("URL") resource address;
   transmitting, from the publisher web server to the end user device, a data package including the information about the invalid URL resource address;
   receiving, at the publisher web server from the end user device, a resource request including the invalid URL resource address;
   arranging, by the plug-in at the publisher web server, for information about the invalid URL resource address and a publisher identifier to be transmitted to the advertisement blocking circumvention platform;
   responsive to receiving the information about the invalid URL resource address, transmitting, from the advertisement blocking circumvention platform to the publisher web server, a message including advertising content; and
   transmitting from the publisher web server to the end user device a response to the resource request including the advertising content such that the advertising content will be delivered via the end user device.

2. The method of claim 1, wherein said receiving, by the publisher web server from the end user device, of the invalid URL resource address does not result in transmission of an error message to the end user device.

3. The method of claim 1, wherein the response to the resource request transmitted from the publisher web server to the end user device embeds the advertising content.

4. The method of claim 3, wherein the advertising content is embedded into at least one of: (i) an image file, (ii) a video file, (iii) an audio file, and (iv) an executable file.

5. The method of claim 4, wherein the advertising content includes at least one of: (i) HyperText Markup Language data, (ii) JavaScript data, and (iii) Cascading Style Sheet data.

6. The method of claim 1, wherein at least one of the publisher web server and advertisement blocking circumvention platform are associated with a cloud based computing service.

7. A method to circumvent advertisement blocking associated with a communication network, comprising:
   receiving, at an advertising blocking circumvention platform via a plug-in installed at a publisher web server, information about a web page request made by an end user device;
   transmitting, from the advertisement blocking circumvention platform to the publisher web server, information including an invalid Uniform Resource Locator ("URL") resource address;
   receiving, via the plug-in at the publisher web server, information about the invalid URL resource address and a publisher identifier indicating that the end user device has transmitted a request including the invalid URL resource address; and
   responsive to receiving the information about the invalid URL resource address, transmitting, from the advertisement blocking circumvention platform to the publisher web server, a message including advertising content such that the advertising content will be delivered via the end user device.

8. The method of claim 7, wherein the invalid URL resource address does not result in transmission of an error message to the end user device.

9. The method of claim 7, wherein the advertising content includes at least one of: (i) HyperText Markup Language data, (ii) JavaScript data, and (iii) Cascading Style Sheet data.

10. The method of claim 7, wherein at least one of the publisher web server and advertisement blocking circumvention platform are associated with a cloud based computing service.

11. An advertisement blocking circumvention platform, comprising:
   (a) a data store containing electronic records associated with advertising content; and
   (b) a computer server, coupled to the data store, programmed to:
      (i) receive, via a plug-in installed at a publisher web server, information about a web page request made by an end user device,
      (ii) transmit to the publisher web server, information including an invalid Uniform Resource Locator ("URL") resource address,
      (iii) receive, via the plug-in at the publisher web server, information associated with the invalid URL resource address and a publisher identifier indicating that the end user device has transmitted a request including the invalid URL resource address,
      (iv) access the data store to retrieve advertising content, and
      (iv) responsive to receiving the information about the invalid URL resource address, transmitting, from the advertisement blocking circumvention platform to the publisher web server, a message including the advertising content such that the advertising content will be delivered via the end user device; and
   (c) a communication port coupled to the computer server to facilitate a transmission of electronic messages via a distributed communication network.

12. The platform of claim 11, wherein the invalid URL resource address does not result in transmission of an error message to the end user device.

13. The platform of claim 11, wherein the advertising content includes at least one of: (i) HyperText Markup Language data, (ii) JavaScript data, and (iii) Cascading Style Sheet data.

14. The platform of claim 11, wherein at least one of the publisher web server and advertisement blocking circumvention platform are associated with a cloud based computing service.

15. A non-tangible, computer-readable medium storing instructions, that, when executed by a processor, cause the processor to perform a method to circumvent advertisement blocking associated with a communication network, the method comprising:
   receiving, at a publisher web server from an end user device via the communication network, a web page request;
   arranging, by a plug-in installed at the publisher web server, for information about the web page request to be transmitted by proxy to an advertisement blocking circumvention platform;
   responsive to receiving the information about the web page request, transmitting, from the advertisement blocking circumvention platform to the publisher web server, information including an invalid Uniform Resource Locator ("URL") resource address;
   transmitting, from the publisher web server to the end user device, a data package including the information about the invalid URL resource address;
   receiving, at the publisher web server from the end user device, a resource request including the invalid URL resource address;
   arranging, by the plug-in at the publisher web server, for information about the invalid URL resource address and a publisher identifier to be transmitted to the advertisement blocking circumvention platform;
   responsive to receiving the information about the invalid URL resource address, transmitting, from the advertisement blocking circumvention platform to the publisher web server, a message including advertising content; and
   transmitting from the publisher web server to the end user device a response to the resource request including the advertising content such that the advertising content will be delivered via the end user device.

16. The medium of claim 15, wherein said receiving, by the publisher web server from the end user device, of the invalid URL resource address does not result in transmission of an error message to the end user device.

17. The medium of claim 15, wherein the response to the resource request transmitted from the publisher web server to the end user device embeds the advertising content.

18. The medium of claim 17, wherein the advertising content is embedded into at least one of: (i) an image file, (ii) a video file, (iii) an audio file, and (iv) an executable file.

19. The medium of claim 18, wherein the advertising content includes at least one of: (i) HyperText Markup Language data, (ii) JavaScript data, and (iii) Cascading Style Sheet data.

20. The medium of claim 15, wherein at least one of the publisher web server and advertisement blocking circumvention platform are associated with a cloud based computing service.

* * * * *